(12) United States Patent
Nelson

(10) Patent No.: US 7,993,075 B2
(45) Date of Patent: Aug. 9, 2011

(54) HEATING CONTROL SYSTEM FOR A SCREED

(75) Inventor: James J. Nelson, Stillwater, MN (US)

(73) Assignee: Caterpillar Paving Products Inc., Minneapolis, MN (US)

( * ) Notice: Subject to any disclaimer, the term of this patent is extended or adjusted under 35 U.S.C. 154(b) by 0 days.

(21) Appl. No.: 12/484,635

(22) Filed: Jun. 15, 2009

(65) Prior Publication Data

US 2009/0257825 A1    Oct. 15, 2009

Related U.S. Application Data

(62) Division of application No. 09/961,483, filed on Sep. 24, 2001, now Pat. No. 7,641,419.

(51) Int. Cl.
*E01C 23/14* (2006.01)
(52) U.S. Cl. ............................. 404/77; 404/79; 432/51
(58) Field of Classification Search .................. 404/77, 404/79, 95; 432/51
See application file for complete search history.

(56) References Cited

U.S. PATENT DOCUMENTS

| | | | |
|---|---|---|---|
| 4,379,653 A | 4/1983 | Brown | |
| 4,561,800 A * | 12/1985 | Hatakenaka et al. | 404/79 |
| 4,781,491 A | 11/1988 | Chiba et al. | |
| 5,131,788 A | 7/1992 | Hulicsko | |
| 5,259,693 A * | 11/1993 | Raymond | 404/95 |
| 5,417,516 A * | 5/1995 | Birtchet | 404/71 |
| 5,439,313 A | 8/1995 | Blaha et al. | |
| 5,521,850 A | 5/1996 | Moe et al. | |
| 5,599,133 A | 2/1997 | Costello et al. | |
| 5,607,254 A * | 3/1997 | Grembowicz et al. | 404/79 |
| 5,747,777 A | 5/1998 | Matsuoka | |
| 5,752,782 A | 5/1998 | Hulicsko | |
| 5,857,804 A | 1/1999 | Musil | |
| 5,895,172 A | 4/1999 | Grembowicz et al. | |
| 6,019,544 A | 2/2000 | Emerson et al. | |
| 6,086,287 A | 7/2000 | Sharpe et al. | |
| 6,318,928 B1 * | 11/2001 | Swearingen | 404/72 |
| 6,334,735 B1 | 1/2002 | Williams et al. | |
| 6,421,594 B1 | 7/2002 | Erasmus | |
| 7,641,419 B1 * | 1/2010 | Nelson | 404/84.05 |

FOREIGN PATENT DOCUMENTS

EP    1036883    9/2000

OTHER PUBLICATIONS

Joseph Vogele AG, Confirmations of Orders for the Paving Machines Super 1900 and Super 2100, 1999, Germany.
Joseph Vogele AG, Product Brochure of the Road Paving Machine Super 1900, 2000-2001, Germany.
Joseph Vogele AG, Product Brochure of the Road Paving Machine Super 2100, 2000-2001, Germany.

(Continued)

*Primary Examiner* — Gary S Hartmann
(74) *Attorney, Agent, or Firm* — Miller, Matthias & Hull

(57) ABSTRACT

A control system for heating a screed assembly of a paving machine is provided. The control system includes a plurality of resistive heating elements positioned adjacent to a screed plate of the screed assembly. An electrical power supply is selectively connected with the resistive heating elements via switches operated by a controller. The controller is responsive to inputs from at least manual switches and temperature sensors. The controller is configured to automatically adjust the temperature of the screed plate by selectively energizing fewer than all of the resistive heating elements at a time.

4 Claims, 3 Drawing Sheets

OTHER PUBLICATIONS

Joseph Vogele AG, Vogele Spare Parts Catalogue, Sep. 17, 2001, pp. 230-231, Germany.
Joseph Vogele AG, Electric Circuit Diagram of the Vogele Paving Machines 1900/2100, Sep. 10, 1999, p. 36, Germany.
Joseph Vogele AG, Electric Circuit Diagram of the Vogele Paving Machines 1900/2100, Sep. 10, 1999, p. 37, Germany.
Joseph Vogele AG, Vogele Training Material: Electric Screed Heating, Sep. 16, 2002, pp. 22-24.
Joseph Vogele AG, Excerpt from the Interconnection List of the Circuit of the Vogele Paving Machines 1900/2100, date unknown.
Joseph Vögele AG, Confirmations of Orders for the Paving Machines SUper 1900 and Super 2100, 1999, 3 pages, Germany.
Joseph Vögele AG, Product Brochure of the Road Paving Machine Super 1900, 2000-2001, 16 pages, Germany.
Joseph Vögele AG, Product Brochure of the Road Paving Machine Super 2100, 2000-2001, 8 pages, Germany.
Joseph Vögele AG, Spare Parts Catalogue, Sep. 21, 2001, pp. 230-231, Germany.
Joseph Vögele AG, Electric Circuit Diagram of the Vögele Paving Machines 1900/2100, Sep. 10, 1999, p. 36, Germany.
Joseph Vögele AG, Electric Circuit Diagram of the Vögele Paving Machines 1900/2100, Sep. 10, 1999, p. 37, Germany.
Joseph Vögele AG, Vögele Training Manual: Electric Screed Heating, Sep. 16, 2002, pp. 22-24.
Joseph Vögele AG, Excerpt from the Interconnection List of the Circuit of the Vögele Paving Machines 1900/2100, 2 pages, date unknown.
Joseph Vögele AG, Opposition filed May 28, 2009, in the European Patent Office against European Patent No. 1295990 B1 (16 pages).

* cited by examiner

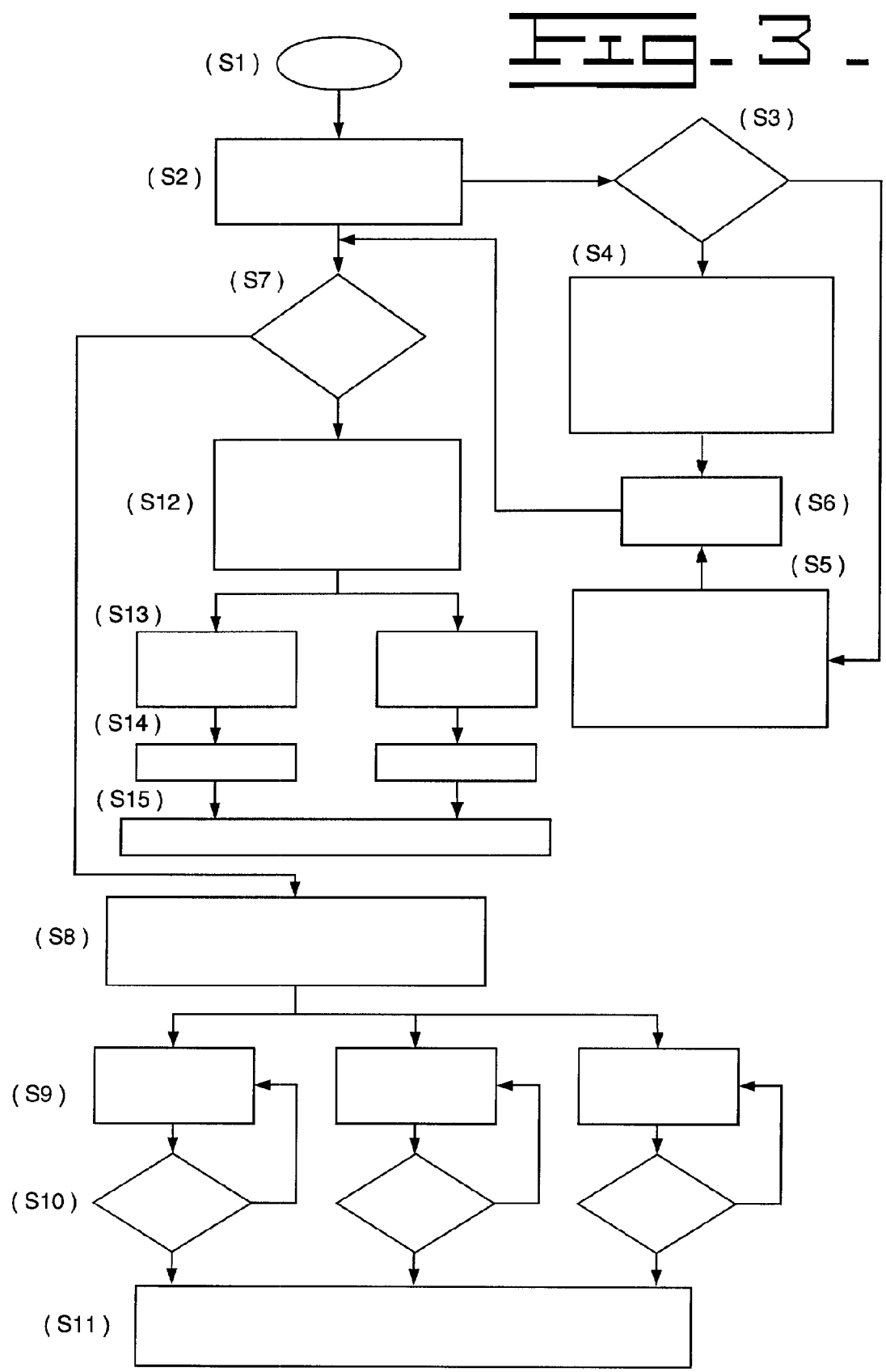

HEATING CONTROL SYSTEM FOR A SCREED

CROSS-REFERENCE TO RELATED APPLICATION

This application is a divisional of application Ser. No. 09/961,483, filed Sep. 24, 2001, currently pending, the disclosure of which is incorporated herein by reference in its entirety.

TECHNICAL FIELD

The invention relates to paving machines and, more particularly to a heating control system for a screed of a paving machine.

BACKGROUND

Paving machines are generally used for laying a heated paving material, such as bituminous aggregate mixtures or asphalt, onto a roadbed and spreading the heated paving material to achieve a road with a uniform, smooth surface. After the heated asphalt is laid it is compacted and cools so that the road becomes passable by vehicles.

The paving machines include a screed assembly for spreading the heated material. The screed assembly has one or more screed plates, and these screed plates are at times heated for ease in manipulating the heated paving material. The temperature of the screed plates is important, because if the temperature is too high, the screed may warp or the heated paving material may be damaged. Also, if the temperature is too low, the heated paving material adheres to the screed and is difficult to spread and compact. Generally, the screed plates should be heated to a temperature close to the temperature of the heated asphalt material.

Controllers have been developed for controlling the temperature of the screed plates. Published patent application WO 00/47822 is directed to a heating control system that automatically regulates the screed plate temperature by adjusting current flow through resistive heating elements for each of the screed plates. However, when the temperature of a screed plate drops below a predetermined value, the entire screed plate is heated even though only a section of the screed plate may require heating. In addition, several screed plates may be heated simultaneously. Heating the entire screed plate or several screed plates simultaneously drains the power supply, which is used for other functions, such as lighting, of the paving machine, and such general heating is inefficient.

The present invention is directed to overcome one or more of the problems as set forth above.

SUMMARY OF THE INVENTION

A heating control system for heating a screed assembly of a paving machine is provided. The screed assembly includes a screed plate. The heating control system includes a plurality of resistive heating elements attached to the screed assembly and positioned adjacent to the screed plate. An electrical power supply is connected to the plurality of resistive heating elements. A controller is connected to the plurality of resistive heating elements to automatically adjust the temperature of the screed plate by selectively energizing one or more of the plurality of resistive heating elements.

A method for heating the screed assembly includes sequentially and automatically energizing one or more of the plurality of resistive heating elements at a time to achieve a predetermined screed plate temperature.

BRIEF DESCRIPTION OF THE DRAWINGS

FIG. 3 is a flow diagram illustrating a method of operation of the heating control system of the present invention.

DETAILED DESCRIPTION

Figure 1:
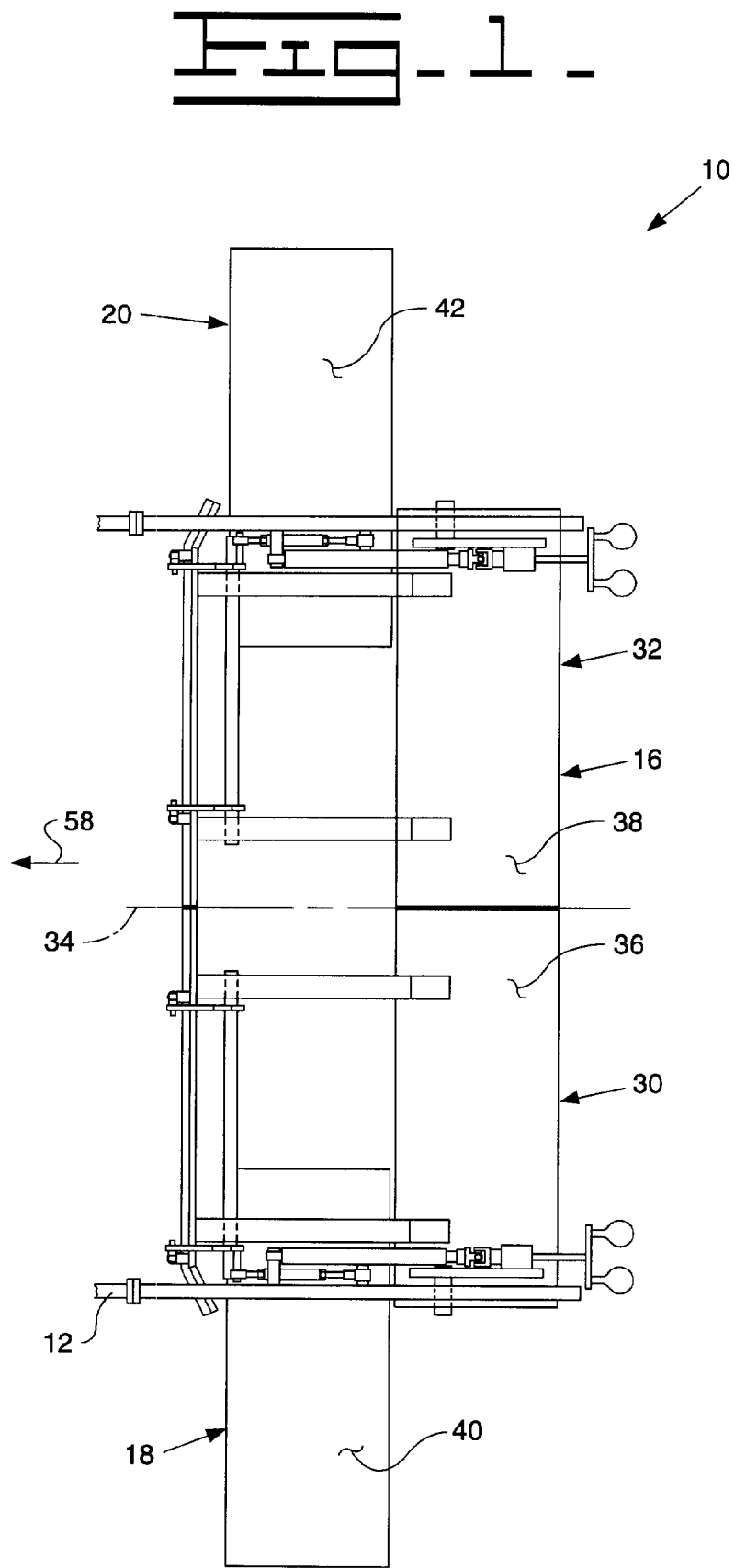
FIG. 1 illustrates a screed assembly, embodying the present invention, that is towed by an asphalt paving machine.
Figure 2:
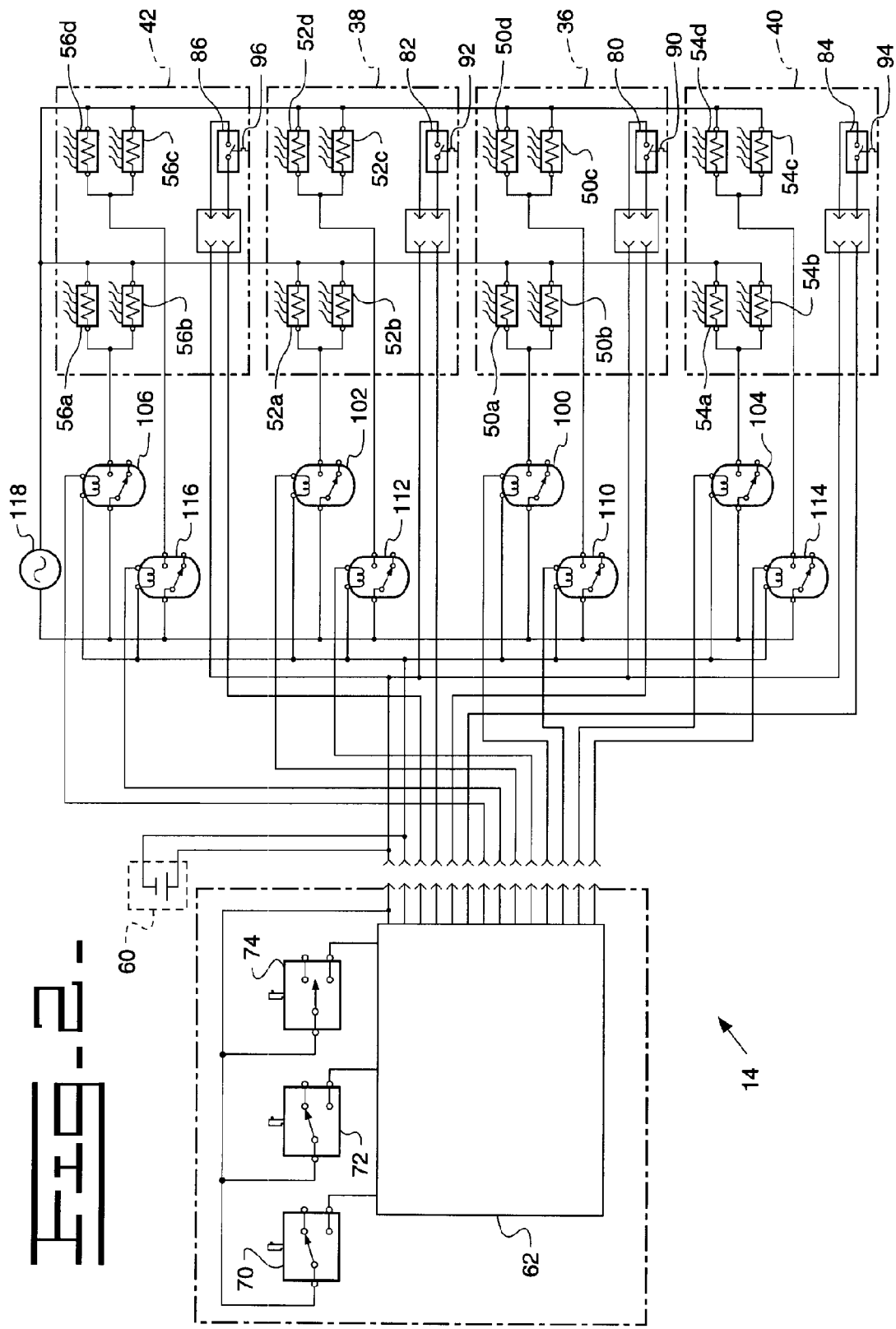
FIG. 2 is a schematic view of a screed heating control system of the present invention.

A screed assembly 10 for a paving machine 12, only a portion of which is, is shown in FIG. 1. The paving machine 12 includes a heating control system 14 as shown in FIG. 2. The screed assembly 10 includes a main screed 16 and left and right screed extensions 18,20. It should be understood that left and right screed extensions 18,20 are shown as being front mounted but can be either front or rear mounted extensions. In an extended mode the left and right screed extensions 18,20 extend outwardly from either side of the main screed 16.

The main screed 16 is made up of first and second sections 30,32 one on each side of a longitudinal central axis 34. The left and right screed extensions 18,20 are slidably mounted to first and second sections 30,32 of the main screed 16 respectively and include first and second screed plates 36, 38. The left and right screed extensions 18,20 also include left and right screed plates 40,42.

The screed assembly 10 functions to spread paving material distributed by the paving machine 12 onto a roadbed. In order to achieve optimum workability of the paving material, the temperature of the screed plates 36,38, 40,42 should be maintained within a predetermined temperature range. This predetermined temperature range is for exemplary purposes, between 250-310° F., however, other temperature ranges may be set. The heating control system 14 automatically controls the temperature of screed plates 36,38, 40,42 and is illustrated in detail in FIG. 2.

The heating control system 14 includes resistive heating elements 50a-50d, 52a-52d, 54a-54d, 56a-56d, an electrical power supply 60 and a controller 62. Power supply 60 is any suitable AC or DC power source that is connected, as by wire, to the controller 62. The power supply 60 shown in FIG. 2, utilizes a 24V DC power supply, but other voltages and power sources may be used, as would be known in the art. The controller 62 may include a typical microprocessor and memory, and can be programmed or hard-wired to provide the functions discussed below.

As illustrated in FIG. 2, the four resistive heating elements 50a-50d, 52a-52d are disposed on first and second screed plates 36,38 respectively, and four resistive heating elements 54a-54d, 56a-56d are disposed on the left and right screed plates 40,42 respectively. However, the present invention is not limited to this construction and other numbers of resistive heating elements may be provided for each screed plate.

The resistive heating elements 50,52,54,56 with subscript a & b are disposed on forward portions of the screed plates 36,38,40,42 and the resistive heating elements 50,52,54,56 with subscript c & d are disposed on rearward portions of the screed plates 36,38,40,42. As used herein throughout, forward refers to the side of the screed plate that is closest in proximity to the paving machine 12, while rearward refers to the farthest away from the paving machine 12. In use, the screed assembly 10 is pulled in the forward direction as indicated by arrow 58 in FIG. 1.

The heating control system 14 also includes inputs to and outputs from the controller 62. An on/off switch 70, a both/rear-only switch 72 and a warm-up switch 74 provide one set of inputs. Each of the switches 70,72 and 74 selectively connect the electrical power supply 60 to respective input connectors of the controller 62. Temperature switches 80,82, 84,86, which are normally open, provide another set of inputs. The function and operation of each of these switches is provided in further detail below.

The temperature switches 80,82,84,86 are provided, one for the first and second screed plates 36,38 of the main screed 16, and one for the left and right screed plate 40,42 of the left and right screed extensions 18,20. A temperature sensor 90,92,94,96 is provided with each temperature switch 80,82, 84,86 to detect the temperature of the corresponding screed plate 36,38,40,42. Temperature switches 80,82,84,86 will close when the detected temperature falls below a first predetermined temperature Ta, e.g., Ta=250° F., and will open when the temperature reaches a second predetermined temperature Tb, e.g., Tb=310° F.

As shown in FIG. 2, eight outputs (1-8) from the controller 62 are provided respectively to eight solenoid relay switches, i.e., four forward output switches 100,102,104,106 and four rearward output switches 110,112,114,116. Two output switches (100,110; 102,112) are assigned for each respective section 30,32 of the main screed plate 16. Similarly, two output switches (104,114; 106,116) are provided respectively for the left and right screed extensions 18,20. The output switches are normally open, and the output switches are closed in response to signals provided from the controller 62. When closed, the switches connect an AC power generator 118 to the respective resistive heating elements 50a-50d, 52a-52d, 54a-54d, 56a-56d, thus selectively heating the screed plates 36,38,40,42 in response to the temperature being below a threshold temperature Ta. Similarly, when the temperature then increases above the second threshold temperature Tb, the closed switch opens and AC power is disconnected from the heating element.

Each temperature switch 80,82,84,86 controls two corresponding output switches of the associated screed plate. As shown in FIG. 2, temperature switch 80 corresponds to the forward and rearward output switches 100,110 of the first screed plate 36, the forward output switch 100 corresponds to the forward resistive heating elements 50a, 50b and the rearward output switch 110 corresponds to the rearward resistive heating elements 50c, 50d. Thus, the heating of the forward and rearward resistive heating elements on the first screed section 30 is separately controlled by the two respective output switches 100, 110. Similarly, temperature switches 82,84, 86 correspond to the second screed section 32 and the left and right screed extensions 18,20 respectively.

FIG. 3 is a flow chart illustrating a control diagram for the present invention. First, the paving machine is turned on (S1), and either the auto mode or the warm-up mode is turned on (S2). If the warm-up mode is turned on, it is determined whether the rear-only mode is turned on (S3). If yes, all of the rearward heating elements are energized simultaneously (S4) until the screed plates reach a predetermined temperature Tb, e.g., 310° F. If no, all of the heating elements are energized simultaneously (S5) until the screed plates reach a predetermined temperature Tb, e.g., 310° F. After all of the desired heating elements have been heated so that the screed plates reach a predetermined temperature Tb, the controller is automatically set to the auto mode.

In the auto-mode, it is determined whether the rear-only mode is turned on (S7). If yes, only the rearward heating elements are to be heated. Each rearward heating element is heated in sequence so that the screed plates are heated in sequence. Of course, if only one screed plate is present, this step may refer to only one rearward heating element being heated at a time, whereas if multiple screed plates are present, those rearward heating elements associated with one screed plate are heated together, followed by the rearward heating elements of a second screed plate, etc.

Next, the temperatures of the screed plates are monitored (S9) and if it is determined that the temperature has fallen below a predetermined temperature Ta, e.g., 250° F., the rearward heating elements of that screed plate are energized (S11). If the temperature is within an acceptable range, the monitoring of the screed plate temperature is continued (S9) until it requires heating.

A similar method is followed if the rear-only mode is not on in the auto mode. Specifically, all of the heating elements for all of the screed plates are heated in sequence (S12). Again, if only one screed plate is present, only one of the heating elements may be heated at a time. If multiple screed plates are present, those heating elements associated with one screed plate may be heated together. Still further, as with the main screed plate that is divided into two sections, those heating elements associated with one section of the screed plate may be energized first, followed by the energizing of the heating elements of the other section of the screed plate.

After the screed plates have reached their predetermined temperatures, the screed plate temperatures are monitored (S13). If a screed plate temperature falls below the predetermined temperature Ta (S14), e.g., 250° F., the temperature switch of that screed plate closes and the controller notifies the associated output to energize the corresponding heating elements (S15). While these heating elements are being energized, other temperature switches may close as other screed plate temperatures fall below 250° F. However, these screed plates are not heated until the heating of the previous screed plate is completed. If more than one temperature switch closes at the same time, the controller activates the outputs for only one of the screed plates at a time, in a random order.

According to the present invention, the controller can be programmed according to the operator's need or the requirements of a particular paving operation. For example, the controller can be programmed to alternately heat each screed plate, or section of a screed plate. Further, the controller can be programmed to heat first one plate, than two plates, or any pre-selected combination of plates in order to provide optimum heating conditions while conserving power.

INDUSTRIAL APPLICABILITY

In operation, the on/off switch 70 on the controller 62 selectively connects the 24V power supply 60 to the controller 62. When the on/off switch 70 is positioned in an ON position, an automatic mode of the heating control system 14 is initiated. In the automatic mode, the controller 62 is programmed to limit the number of plates or sections that can be activated at a time. For example, only one of two output switches that control heaters in the first and second screed sections 18,20 or left and right screed extensions 30,32 is on at a time. Moreover, the controller 62 can be programmed to allow only one of the output switches that controls right or left hand side heaters of both the extension and main screed plates to be on at one time, i.e., only one extending screed plate or section of the main screed plate can be heated at a time. This control can be variably programmed to have one or more, but fewer than all of the heaters to be on at a time, as would be understood by one skilled in the art.

The warm-up switch 74 may be activated if it is desirable to heat more than screed extension plate 40,42 or first and second section plate 36,38 of the main screed plate 16 simultaneously. Such simultaneous heating may be desirable during initial start up of the paving machine 12. When the warm-up switch 74 is activated, the controller 62 turns on all the outputs switches 100,102,104,106,110,112,114,116 at the same time if all the temperature switches 80,82,84,86 are closed. Once the screed plates 36,38,40,42 have reached their predetermined temperatures, the temperature switches 80,82,84,86 open, and the controller 62 returns to automatic mode.

Also, the warm-up switch 74 overrides the automatic mode. Thus, when the automatic mode is not providing the type of surface finish desired, due to inadequate heating, the warm up mode can be activated. After all the temperature switches open once, the controller 62 may go back to the automatic mode. Alternatively, the warm-up mode may be manually controlled. For example, the warm-up switch 74 also can act as an override for the warm-up mode. Thus, if the operator determines that the appropriate surface finish is being achieved, the warm-up switch 74 can be operated again, and the controller 62 will go back to automatic mode.

During normal operation the screed plates 36,38,40,42 will cool down and the temperature switches 80,82,84,86 will close. The temperature sensors 90,92,94,96 detect the temperature of the corresponding screed plate 36,38,40,42 and when the temperature falls below a predetermined level, the temperature switch 80,82,84,86 closes. The controller 62 receives a signal that the temperature switch 80,82,84,86 has closed and that the corresponding screed plate 36,38,40,42 should be heated. The controller 62 will energize the resistive heating element or elements corresponding to that screed plate 36,38,40,42 in the time sequenced order in which the temperature switches close. For example, if temperature switch 80 closes first, outputs 100, 110 turn on, and then when another temperature switch 84 closes, the controller 62 detects the closing but it waits for outputs 100,110 to turn off before issuing a signal to the appropriate relay to turn on the next outputs 104,114. If multiple temperature switches close while an output is on, then the next outputs associated with a particular screed plate or section will be turned on in the order in which the temperature switch is closed.

With this automatic mode, only one screed plate 36,38,40, 42 can be heated at a time, thus, conserving power for other operations of the paving machine 12. For example, with conventional heating systems several screed plates may be heated simultaneously. This depletes power from other functions, for example, the paving machine speed may slow down, thus slowing down paving operations and affecting road quality. With the present invention, only a limited amount of power is used to heat the screed plates at any given time, and thus other functions of the paving machines are not affected during normal operation.

In general, only certain screed plates require heating due to the manner in which the asphalt material interacts with the screed plates. For example, during paving operations, high temperature asphalt material is conveyed from the paving machine 12 onto the roadbed surface. This high temperature asphalt material reaches the center portions (i.e., main screed 16) of the screed assembly 10 first, since the material is conveyed from a central portion of the paving machine 12, and then tends to spread toward the left and right screed extensions 18,20. Since the asphalt material temperature lowers from the time it contacts the main screed 16 to the time it contacts the left and right screed extensions 18,20, the left and right screed plates 40,42 are influenced less by the asphalt temperature. Thus, the left and right screed plates 40,42 tend to require more heating than the first and second screed plates 36,38.

The both/rear only switch 72 distinguishes the forward outputs 100,102,104,106 from the rearward outputs 110,112, 114,116. When the both/rear only switch 72 is off, i.e., "both" is activated, all outputs, forward 100,102,104,106 and rearward 110, 112,114,116, are enabled. However, when the both/rear-only switch 72 is on, i.e., "rear-only" is activated, only the rear output switches 110, 112,114,116 can be closed.

For example, if the rear-only switch 72 is on, only the temperature switch 116 for the right screed plate 42 can close, and thus only the rearward resistive heating elements 56c,56d associated with the temperature switch 116 are energized accordingly.

This feature provides for a more efficient use of the power supply 60 under certain conditions. Namely, those conditions are where only the rearward portion of the screed plate needs to be heated, making it inefficient to energize the forward resistive heating elements. This condition may be preferred due to the manner in which the heated asphalt material interacts with the screed plates. For instance, when the asphalt material is first conveyed from the paving machine 12 onto the roadbed it has a high temperature. This high temperature asphalt contacts the front portions of the screed plates 36,38, 40,42, and then reaches the back portions of the screed plates 36,38,40,42 as the screed assembly 10 travels over the asphalt material. However, the temperature of the asphalt material lowers by the time it reaches the back portions of the screed plates 36,38,40,42. Thus, the rear portions of the screed plates 36,38,40,42 are not as influenced by the heated temperatures of the asphalt material, as compared to the front portions of the screed plates 36,38,40,42. Thus, under certain conditions, it may be desirable to only energize the rearward resistive elements in order to conserve power of the paving machine.

During initial start-up of the paving machine 12, all of the temperature switches 80,82,84,86 will probably be closed since the screed plate temperatures will be low from lack of use. If the controller 62 is set to automatic mode, there is no priority of turning on the output switches 100, 102,104,106, 110,112,114,116, and they can be randomly activated. Alternatively, the controller 62 can be programmed to heat the screed plates 36,38,40,42 in a predetermined order.

Of course, automatic mode can be overridden by initiating the warm-up mode in which case all the outputs would be activated at the same time as described earlier.

It will be apparent to those skilled in the art that various modifications and variations can be made to the present invention without departing from the spirit or scope of the invention. For instance, additional outputs may be provided to more specifically control each individual heating element, or more or less heating elements may be provided to more specifically control the heating of each screed plate. Thus, it is intended that the present invention cover the modifications and variations of the invention provided they come within the scope of the appended claims and their equivalents.

Other aspects, objects and advantages of this invention can be obtained from a study of the drawings, the disclosure, and the appended claims.

What is claimed is:

1. A method for operating a heating control system for a screed assembly of a paving machine, the method comprising:

providing a first screed plate having a first portion and a second portion;

providing a first set of resistive heating elements associated with the first screed plate, the first set of resistive heating elements including at least one resistive heating element in the first screed plate first portion and at least one resistive heating element in the first screed plate second portion;

providing a first screed plate temperature sensor configured to generate an on signal when a temperature of the first screed plate reaches a low temperature limit and an off signal when the temperature of the first screed plate reaches a high temperature limit;

providing a second screed plate having a first portion and a second portion;

providing a second set of resistive heating elements associated with the second screed plate, the second set of resistive heating elements including at least one resistive heating element in the second screed plate first portion and at least one resistive heating element in the second screed plate second portion;

providing a second screed plate temperature sensor configured to generate an on signal when a temperature of the second screed plate reaches the low temperature limit and an off signal when the temperature of the second screed plate reaches a high temperature limit;

providing a first switch having a auto position and a warm-up position;

providing a second switch having a partial screed plate heating position and a full screed plate heating position;

operatively coupling a controller to the first set of resistive heating elements, the first screed plate temperature sensor, the second set of resistive heating elements, the second screed plate temperature sensor, the first switch, and the second switch, the controller operating in a partial heat auto mode with the first switch in the auto position and the second switch in the partial screed plate heating position in which the controller is configured to:

monitor the first and second screed plate temperature sensors;

when one of the first and second screed plate temperature sensors generates an on signal, determine whether a currently energized resistive heating element is present;

when a currently energized resistive heating element is not present, energize only the at least one resistive heating element in the first portion of the screed plate associated with the temperature sensor with the on signal; and when a currently energized resistive heating element is present, wait until the currently energized resistive heating element is deenergized before energizing only the at least one resistive heating element in the first portion of the screed plate associated with the temperature sensor with the on signal.

2. The method of claim 1, in which the controller further comprises a partial heat warm-up mode with the first switch in the warm-up position and the second switch in the partial screed plate heating position, in which the controller is configured to:

simultaneously energize the first and second sets of resistive heating elements; and automatically switch to partial heat auto mode when each of the first and second screed plate temperature sensors generates an off signal.

3. The method of claim 1, in which the at least one resistive heating element in the first portion of the screed plate associated with the temperature sensor with the on signal is energized for a predetermined period of time selected so that the first portion of the screed plate reaches a predetermined temperature.

4. The method of claim 1, in which the first portions of the first and second screed plates comprise rearward portions of the first and second screed plates and in which the second portions of the first and second screed plates comprise forward portions of the first and second screed plates.

* * * * *